United States Patent [19]

Dunnavant et al.

[11] Patent Number: 4,758,400
[45] Date of Patent: Jul. 19, 1988

[54] THERMOSETTING MOLDING COMPOUNDS

[75] Inventors: William R. Dunnavant, Westerville; Gilbert M. Gynn, Dublin; Richard E. Field, Columbus, all of Ohio

[73] Assignee: Ashland Oil, Inc., Russell, Ky.

[21] Appl. No.: 6,866

[22] Filed: Jan. 27, 1987

[51] Int. Cl.$^4$ ............................................. B29C 43/02
[52] U.S. Cl. .................................. 264/320; 264/137; 264/257; 264/325
[58] Field of Search ........... 264/137, 324, 325, 331.18, 264/331.19, 331.21, 320, 257

[56] References Cited

U.S. PATENT DOCUMENTS

| | | | |
|---|---|---|---|
| 4,331,735 | 5/1982 | Shanoski | 264/257 |
| 4,340,562 | 7/1982 | Gross et al. | 264/328.18 X |
| 4,374,229 | 2/1983 | Dunnavant et al. | 525/440 X |
| 4,506,055 | 3/1985 | Bristowe et al. | 525/455 X |

FOREIGN PATENT DOCUMENTS 56-76432  6/1981  Japan ............................. 264/331.21

*Primary Examiner*—Jan H. Silbaugh
*Assistant Examiner*—Yun H. Wang
*Attorney, Agent, or Firm*—H. M. Hanegan; M. E. Picken; D. L. Hedden

[57] ABSTRACT

Fiber reinforced molding compounds wherein the resinous matrix is a thermosetting linear polymer characterized in constituting two oligomeric ethylenically unsaturated polyester segments joined through a polyurethane residue and having acryloyl or methacryloyl end groups.

10 Claims, No Drawings

THERMOSETTING MOLDING COMPOUNDS

BACKGROUND OF THE INVENTION

1. Field of the Invention

This invention relates to a method for the manufacture of thermoset plastic articles from a fiber reinforced molding compound.

2. Background Prior Art

Polyester resinous compositions; i.e., ethylenically unsaturated polyester oligomers dissolved in a reactive diluent in the form of a vinyl monomer crosslinking agent, typically styrene, enjoy widespread recognition in the industry as the resin of choice for use in a variety of laminating and bulk molding applications. The latter application accounts for the major usage of such resin compositions. These moldings for the most part are prepared by a compression molding operation in which the moldable charge exists in the form of a fiber reinforced molding compound. Perhaps the most utilized of such molding compounds is the sheet molding compound which in the trade is customarily referred to as SMC. As the name implies SMC consists of an extended length of the molding compound which can vary in thickness and width, typically of such dimensions being in the order of $\frac{1}{4}''$ and 24", respectively. Besides reinforcement, the SMC can contain a filler and pigment as well as the usual adjuvant amounts of a free radical polymerization initiator, promoter, inhibitor, mold release agent, etc. Due to the incorporation of an ionic bonding thickener in the form of an alkaline earth metal oxide or hydroxide, the SMC physically exists as a relatively non-tacky leathery material which handles conveniently in appropriately sizing a desired mold charge. The use of the prior art SMC, however, poses a problem in that the odor of styrene is unpleasant and becomes extremely aggravatingly so at the elevated temperatures experienced in the molding operation. The practice of the present invention on the other hand completely obviates this particular shortcoming of the prior art.

SUMMARY OF THE INVENTION

In accordance with this invention a method is provided for the manufacture of thermoset plastic articles from an essentially volatile-free fiber reinforced molding compound. The resin matrix of such compounds when initiating the preparation thereof consist essentially of a reactable mixture of a polyisocyanate and a vinyl esterol. The latter is a trivial name for an ethylenically unsaturated oligomeric polyester characterized in having an acryloyl or methacryloyl end group and terminated at the other end with a hydroxyl group. Following impregnation of the reinforcing fiber content of the compound and distribution of the various additives the compound is aged at ambient temperature to effect substantial completion of the urethane forming exothermic chemical reaction between the polyisocyanate and the oligomer. Advantageously the exothermic heat of reaction is substantially removed or dissipated before the heat reaches a level which would trigger premature polymerization in the presence of a catalyst. Aging serves to effect the urethane forming reaction between the polyisocyanate and the vinyl esterol thereby advancing the compound to a thickened but ungelled condition. The thickened compound exhibits marked stability toward progressive polymerization upon storage. Moreover, the resultant compound can be stored for an extended period at room temperature without the need for sealed storage to limit loss of volatiles.

Moldings prepared in accordance with this invention inherently develop several unique performance-related qualities. For one, the degree of shrinkage experienced in the curing operation ameliorates the need for coping with this general shortcoming of resins derived by free radical polymerization techniques. Likewise, as a substrate for paint finishes or for structural bonding applications the resultant moldings exhibit a high order of adhesiveness.

DESCRIPTION OF THE PREFERRED EMBODIMENTS

The basic resin structure of the vinyl esterols useful in the practice of this invention is essentially that of a linear oligomeric polyester backbone of alternating dicarboxylic acid and diol residues. The indicated polyester backbones are specifically characterized in being terminated at one end with an acryloyl or methacryloyl group and at the other end with a hydroxyl group. These products can be conveniently prepared by the catalytically induced chain extending addition reaction of a lower alkylene oxide and a dicarboxylic acid anhydride in the presence of an acrylic acid whose active hydrogen atom serves as the chain initiator. If it is desired to use an initiator wherein the active hydrogen atom is associated with a hydroxyl group, one lower alkylene oxide to provide the half acid ester of the corresponding diol.

An applicable method for preparing the contemplated vinyl esterols basically involves progressively adding the alkylene oxide to a reactor charge of the initiator and the diacid anhydride. The molecular ratio that the initiator bears to the total anhydride reactants basically governs the average molecular weight of the resultant oligomer. In this respect the viscosity of the resultant oligomer is primarily determinative of a suitable molecular weight with 200–800 being broadly applicable in the practice of this invention. The preferred average calculated molecular weights is between about 300 and 500. As previously pointed out the contemplated oligomers contain a hydroxyl end group which is obtained by using an appropriate excess of the alkylene oxide reactant. Further details concerning suitable catalysts for effecting the addition reaction, processing temperature conditions and the like, can be found in U.S. Pat. No. 3,723,390. While the indicated patented process is directed to a continuous process for producing such polyesters, one can refer to the plurality of references cited therein for further details concerning a batch operation as generally outlined hereinabove.

In the preparation of the vinyl esterols as aforedescribed, any of the $C_2$–$C_4$ alkylene oxides or mixtures thereof can be used. Propylene oxide, however, represents the preferred reactant. Maleic anhydride is desirably used exclusively or as a major portion of the diacid anhydride component for imparting ethylenic unsaturation. A variety of other dibasic acid anhydrides can be used in combination with the maleic anhydride in the practice of such an embodiment. Representative of such anhydrides include phthalic, succinic, chlorendic, itaconic as well as substituted derivatives thereof.

As indicated above, maleic anhydride is used exclusively or as a major portion of the diacid anhydride component in the preparation of the esterol. In either case, however, the maleic residues of the resultant esterol are substantially completely isomerized to fumaro residues. This can be readily accomplished in the presence of an isomerization catalyst at temperatures which do not adversely affect the terminal acryloyl group provided the esterol does not exhibit an acid value in excess of about 3 and more preferably not in excess of 1. Applicable isomerization catalyst include a variety of secondary monoamines of which morpholine represents the catalyst of choice.

A variety of aromatic and aliphatic polyisocyanates are suitable for use in the practice of this invention. Representative polyisocyanates include toluene diisocyanate, xylylene diisocyanate and hexamethylene diisocyanate. Diphenylmethane diisocyanate (MDI) and the various polymeric analogs thereof, particularly the latter, represent the preferred polyisocyanates for use in the practice of this invention. In the compounding operation the polyisocyanate and the vinyl esterol are combined to provide an NCO/OH equivalent ratio value of from 0.5–1.2, and more preferably in the ratio of from 0.6–1.2, respectively.

In connection with the foregoing enumeration of applicable polyisocyanates it is to be appreciated that the use of conventional diol extenders as observed in preparing polyurethanes can likewise be advantageously resorted to in preparing the molding compounds of this invention. This expediency basically represents a way for effectively increasing the molecular weight of the overall thermosetting resinous composition. However, this molecular weight build up and the accompanying increase in viscosity only occurs during the thickening step and thus does not complicate the compounding operation. Typical diols include propylene glycol, diethylene glycol and the higher polyoxyakylene glycols. Another important type of diol for this purpose is the so-called polyester diol. The latter is a low molecular weight polyester terminated at each end with a hydroxyl group. An esterification product of a mol of maleic anhydride and two mols of a glycol represents the simplest of such unsaturated polyester diols. Polyester diols of varying molecular weight can be conveniently prepared by the general method described above for obtaining the contemplated vinyl esterols wherein a diol is used as the initiator for the chain extending resinification reaction. Preferably the polyester diol unsaturation is derived from an a,b-ethylenically unsaturated dicarboxylic acid or anhydride.

Conventional practices are observed in preparing the molding compounds contemplated herein. While there has been a specific reference hereinabove to the standard designation of SMC, such actually denotes a broad class of compounds which includes the HMC, XMC and the like types. These individual designators simply serve to indicate the fiber content, the type of fibrous reinforcer and other specific characteristics of the particular molding compound concerned. Additionally contemplated are the prepreg compounds and compounds for preparing pultruded or filament wound shapes.

The following examples serve to illustrate the present invention including the best mode contemplated for carrying out same. All parts specified are such as parts by weight unless otherwise indicated.

EXAMPLE I (Prior Art)

This example serves to illustrate the preparation of the vinyl esterol which will be employed in the subsequent working examples of the present invention. As such the formulation represents a modification of the vinyl esterol described in the corresponding example of U.S. Pat. No. 4,374,229.

Into a suitable resin reaction vessel were charged 321 parts of maleic anhydride, 309 parts of methacrylic acid, 1.26 parts of hydroquinone and 3.25 parts of magnesium hydroxide. The reactor was evacuated to 0.2 atmosphere and dry nitrogen bled into one atmosphere. With agitation the reactor contents were heated to 60° C., whereupon 558 parts of propylene oxide were added at a rate so that the temperature was maintained constant at about 120° C. On completion of the propylene oxide addition, heating was continued at the indicated temperature until the acid value of about 0.5 was obtained. The resultant product exhibited a hydroxyl value of 187 corresponding to a calculated average molecular weight of about 300.

To the reactor contents were added 11 parts of morpholine and with agitation held at 80° C. for about 20 minutes. Analysis of the resultant product indicated that in excess of 95% of the starting maleate residues were isomerized to fumarate residues.

EXAMPLE II

| A. Resin Mix Formulation (Parts) | COMPOUND | | |
|---|---|---|---|
| | #1 | #2 | #3 |
| Vinyl esterol (Example I) | 73.2 | 70.2 | 67.5 |
| Isonate 143L (Upjohn) | 26.8 | 29.3 | 32.5 |
| t-butyl perbenzoate | 1.0 | 1.0 | 1.0 |
| Zinc stearate | 4.0 | 4.0 | 4.0 |
| NCO/OH (equivalent ratio) | 0.75 | 0.85 | 1.0 |

B. HMC Preparation

The individual premixed formulations noted above were combined with chopped glass fiber on a conventional SMC machine to give respective glass levels of about 65 percent. The resultant HMC sheet was rolled and allowed to stand at room temperature overnight. During the indicated aging period the individual compounds thickened to a suitable C. Testing Procedure and Results Several 12"×12"×0.1" panels of each compound were compression molded using a cure cycle of 3 minutes at 290–300° F. under 1000 psi pressure. Test specimens were machined from the molded panels and tested for the properties noted below according to the applicable ASTM method, the results of which are set forth as follows:

| | #1 | #2 | #3 |
|---|---|---|---|
| Tensile Strength, KSI | 36.4 | 28.0 | 26.5 |
| Tensile Modulus, 10⁶ psi | 2.48 | 1.7 | 1.8 |
| Elongation, % | 1.9 | 2.0 | 2.0 |
| Flexural Strength, KSI | 64.9 | 49.6 | 56.3 |
| Flexural Modulus, 10⁶ | 2.46 | 2.02 | 2.19 |
| Notch Izod, ft. lbs./in. | 29.7 | 24.4 | 22.3 |
| Glass content, % | 63.5 | 55 | 56 |

EXAMPLE III

This example illustrates the use of a polyester diol as the polyisocyanate extender in the preparation of two varieties of SMC employing the vinyl esterol of Example I.

| A. Resin Mix Formulation (Parts) | |
| --- | --- |
| Vinyl esterol (Example I) | 100 |
| Polyester diol* | 100 |
| I-143L (Upjohn) | 66.7 |
| t-butyl perbenzoate | 2.7 |
| NCO/OH | .71/0.0 |

*Polyester diol - a maleic acid anhydride/propylene glycol condensate having an acid number of 4.2 and a hydroxyl number of 178.

B. Procedure

The indicated reactant mixture was blended and degassed. The resultant blend was applied to glass mat and glass cloth to provide a reinforcement content of about 25% and 30%, respectively.

The prepreg sheets were covered with Mylar film and allowed to thicken overnight at room temperature. The individual molding compounds were then molded in a press observing a cure of 10 minutes at 275° F. under 25 psi pressure to provide hard crosslinked composites.

What is claimed is:

1. A method for the manufacture of shaped thermoset articles from a thermosetting urethanized vinyl esterol resin based sheet molding compound which comprises:
   (a) forming said molding compound wherein the resin component in the preliminary or unthickened stage is a reactant mixture of a polyisocyanate and a linear polyester oligomer characterized in having a calculated average molecular weight of from about 200–800 whose backbone structure contains a plurality of fumaro residues and where the oligomer is terminated at one end with a hydroxyl group and at the other end with either an acryloyl or methacryloyl group, said reactant mixture having an NCO-/OH equivalent ratio between about 0.5 and 1.2;
   (b) aging the molding compound at ambient temperature to effect substantial completion of the urethane forming exothermic chemical reaction between the polyisocyanate and said oligomer;
   (c) then shaping the molding compound under applied heat and pressure to provide a thermoset article; and
   (d) where in step (b) the exothermic heat of reaction a level which would trigger premature polymerization in the presence of a catalyst.

2. The method according to claim 1 wherein the average calculated molecular weight of said linear polyester oligomer is from about 300–500, and the terminal group at the other end is a methacryloyl group.

3. The method according to claim 2 wherein said polyisocyanate is a diisocyanate.

4. The method according to claim 3 wherein the NCO/OH equivalent ratio is between about 0.6 and 1.2.

5. The method according to claim 4 wherein said diisocyanate is a polymeric diphenyl methane diisocyanate.

6. A method for the manufacture of shaped thermoset articles from a thermosetting urethanized vinyl esterol resin based sheet molding compound which comprises:
   (a) forming said molding compound wherein the resin component in the preliminary or unthickened stage is a reactant mixture of a diisocyanate, a diol extender and a linear polyester oligomer characterized in having an average molecular weight of from about 300–500 whose backbone structure contains a plurality of fumaro residues and where the oligomer is terminated at one end with a methacryloyl group, said reactant mixtures having an NCO/OH between about 0.5 and 1.2;
   (b) aging the molding compound at ambient temperature to effect substantial completion of the urethane-forming exothermic chemical reaction between the polyisocyanate and said oligomer;
   (c) then shaping the molding compound under applied heat and pressure to provide a thermoset article; and
   (d) where in step (b) the exothermic heat of reaction is substantially dissipated before the heat reaches a level which would trigger premature polymerization in the presence of a catalyst.

7. The method according to claim 6 wherein said diol extender is a glycol.

8. The method according to claim 6 wherein said diol extender is a polyester diol.

9. The method according to claim 8 wherein said polyester diol is an unsaturated polyester diol wherein the unsaturation is derived from an a, b-ethylenically unsaturated dicarboxylic acid or anhydride.

10. The method according to claim 9 wherein the diisocyanate is a polymeric diphenyl methane diisocyanate.

* * * * *